(12) United States Patent
Oba et al.

(10) Patent No.: US 7,140,604 B2
(45) Date of Patent: Nov. 28, 2006

(54) PARTS RETAINING PANEL AND METHOD OF MOUNTING AND SECURING PARTS

(75) Inventors: Fumiaki Oba, Osaka (JP); Atsushi Kumakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 100 days.

(21) Appl. No.: 10/772,916

(22) Filed: Feb. 5, 2004

(65) Prior Publication Data

US 2004/0182981 A1  Sep. 23, 2004

(30) Foreign Application Priority Data

Mar. 18, 2003  (JP) .............................. 2003-073956

(51) Int. Cl.
*B25B 5/14* (2006.01)
(52) U.S. Cl. ........................................ 269/40; 269/287
(58) Field of Classification Search .......... 248/346.01, 248/346.03, 346.06, 346.5; 269/40, 287, 269/288; 211/49.1, 59.4, 126.12, 126.7, 211/194; 108/53.1, 91, 92, 53.3; 206/486, 206/523, 589, 585, 821
See application file for complete search history.

(56) References Cited

U.S. PATENT DOCUMENTS 4,770,399 A   9/1988  Sosson et al.
5,685,441 A * 11/1997  Calfee ........................ 211/194
6,237,207 B1   5/2001  Vom Stein

FOREIGN PATENT DOCUMENTS

| DE | 40 25 126 | 2/1992 |
|----|-----------|--------|
| DE | 196 22 122 | 12/1997 |
| EP | 0 725 213 | 8/1996 |
| FR | 2 381 666 | 9/1978 |
| GB | 1249871 | 10/1971 |
| GB | 2 347 174 A | 8/2000 |

OTHER PUBLICATIONS

Patent Abstracts of Japan, Assembler for Timing Belt in Engine, Publication No. 62228607, Publication Date Jul. 10, 1987, Application No. 61071206, Inventor's Name, Hijikata Toshihiro.

* cited by examiner

Primary Examiner—A. Joseph Wujciak, III
(74) Attorney, Agent, or Firm—Howson and Howson

(57) ABSTRACT

A parts retaining panel, especially useful in assembling the timing drive of an internal combustion engine, retains the timing components in the same arrangement that they are in when mounted on the engine. The parts can be stored and transported on stacked retaining panels, and, after the parts are mounted on the engine, the panel 32 is removed and reused. The parts retaining panel reduces assembly time, and prevents mounting of improper parts and inadvertent omission of parts.

17 Claims, 5 Drawing Sheets

PARTS RETAINING PANEL AND METHOD OF MOUNTING AND SECURING PARTS

FIELD OF THE INVENTION

This invention relates to a parts retaining panel on which parts are removably retained in the same arrangement as when finally mounted in an assembly, and to a method of mounting parts. More particularly, the invention relates to a parts retaining panel on which the parts of a timing drive are removably retained in the same arrangement as when finally mounted on an engine, and to a method of mounting timing drive system parts.

BACKGROUND OF THE INVENTION

In an internal-combustion engine, a timing drive system synchronously transmits rotation from the crankshaft to the camshaft in the case of a single overhead cam (SOHC) engine, and from the crankshaft to both camshafts in a double overhead cam or twin cam (DOHC) engine. Most recent automobile engines are DOHC engines. These timing drives can include chain drives, in which power is transmitted by a chain wrapped around sprockets, and toothed belt drives, in which power is transmitted by a toothed belt wrapped around toothed pulleys.

A chain drive in a DOHC engine, comprises camshaft sprockets respectively secured to two camshafts, and a crankshaft sprocket secured to a crankshaft. Similarly, a toothed belt timing drive comprises toothed pulleys secured respectively to two camshafts, and a toothed pulley secured to a crankshaft. In both cases, the timing drive synchronously transmits rotation from the crankshaft to the camshafts at a ratio of 2:1. Each of these timing drive systems also comprises other parts such as a tensioner, a tensioner lever, a chain or belt guide, and the like.

In the process of assembling a timing drive, each of the several parts must be properly mounted and secured at the appropriate position on the engine. Problems have arisen, especially when a worker forgets to mount a particular part. Moreover, the conventional timing drive assembly process requires a significant amount of time, and is therefore costly.

One approach to solving these problems is described in published British patent application 2347174. In this approach, parts, such as a crankshaft sprocket, camshaft sprockets, a timing chain, a guide rail, a tensioner lever, and a tensioner, are assembled on first and second cover parts to provide a completed assembly, which can be mounted on an engine.

Similar problems arise in the case of a bicycle, where parts such as a pedal sprocket, a rear wheel sprocket, and a chain, are separately prepared and independently mounted and secured at appropriate positions on the bicycle in the assembly process. In the assembly of a bicycle drive, as well as in the assembly of an engine's timing drive, the mounting and securing of parts requires significant time and is therefore costly. There is also a risk that parts will be forgotten. In the case where the parts are stored and transported to an assembly location, it is frequently necessary to take the troublesome step of packaging the parts together as a set. Moreover, the sizes of the parts can vary where different engines or different bicycles are being produced, and in such a case, there is a risk of mounting an improper part.

Furthermore, in the pre-assembled timing transmission described in British patent application 2347174, since the timing transmission is accommodated in a case composed of first and second cover parts, the cost of the assembly is relatively high, problems of oil sealing and sound insulation arise, and there is also the problem of making cases that accommodate the shapes and sizes of different engines.

The principal object of this invention is to provide a parts retaining panel that can be transported while parts are retained thereon in their final arrangement, so that the parts can be readily and easily mounted and secured in the process of assembly of a machine such as a bicycle or internal combustion engine, and so that forgetting to mount parts can be avoided. It is also an object of the invention to provide an advantageous method of mounting and securing parts in the assembly of a drive such as a bicycle drive or the timing drive of an internal combustion engine.

SUMMARY OF THE INVENTION

The assembly in accordance with the invention comprises a parts-retaining panel and a set of cooperating parts for a mechanism, said parts being removably retained on the parts-retaining panel in the same positions relative to one another as the positions of the parts relative to one another when in operative relationship in the mechanism. The panel is removable from the parts when the parts are mounted in operative relationship in the mechanism. In a preferred embodiment, the mechanism is an internal combustion engine, and the parts are the parts of the timing drive.

Preferably, the parts-retaining panel includes a plurality of retainers protruding from a face thereof, and holding the parts on the panel. The panel also preferably includes a plurality of through holes through which fasteners for securing the parts to the engine can be inserted.

Preferably, the parts are retained on the panel in the same cooperative relationship to one another as when in operative relationship in the engine.

A preferred parts-retaining panel has a plurality of corners, each corner having a leg. The legs are engageable with an adjacent, identical, panel and of sufficient length to maintain the panels in spaced relationship to each other when stacked. Thus, a space is provided between the panels to accommodate a set of parts retained on the adjacent panel. The panel is also preferably recyclable.

In accordance with the invention, the mounting and securing of a set of cooperating parts for a machine is carried out by the steps of removably retaining the parts on a parts-retaining panel in the same positions relative to one another as the positions of the parts relative to one another when in operative relationship in the machine, placing the parts-retaining panel, with the parts thereon, in face-to-face relationship with a mounting surface of a machine, securing the parts to the machine, and removing only the panel. In a preferred application, the machine is an internal combustion, and the parts are the parts constituting the timing drive of the engine.

The invention affords significant advantages in that it allows the mounting and securing of the parts of a mechanism to be carried out more rapidly and more easily, and reduces the chance of mounting a wrong part or inadvertently omitting a part. The invention also has the advantage that the parts-retaining panel can be removed and re-used repeatedly.

The provision of protruding retainers on the parts-retaining panel facilitates the mounting and securing of timing drive parts on the panel. Furthermore, the provision of through holes on the parts-retaining panel facilitates the mounting and securing of timing drive parts on engine.

The mounting and securing of the parts on an engine is further facilitated by retaining the parts on the panel in the same cooperative relationship to one another as when in operative relationship in the engine.

The provision of legs at the corners of the panels improves storage, transportation, and handling of the parts-retaining panels, both with and without timing drive parts retained thereon. Using recyclable panels contributes to saving of resources.

DETAILED DESCRIPTION OF THE PREFERRED EMBODIMENTS

Figure 1:
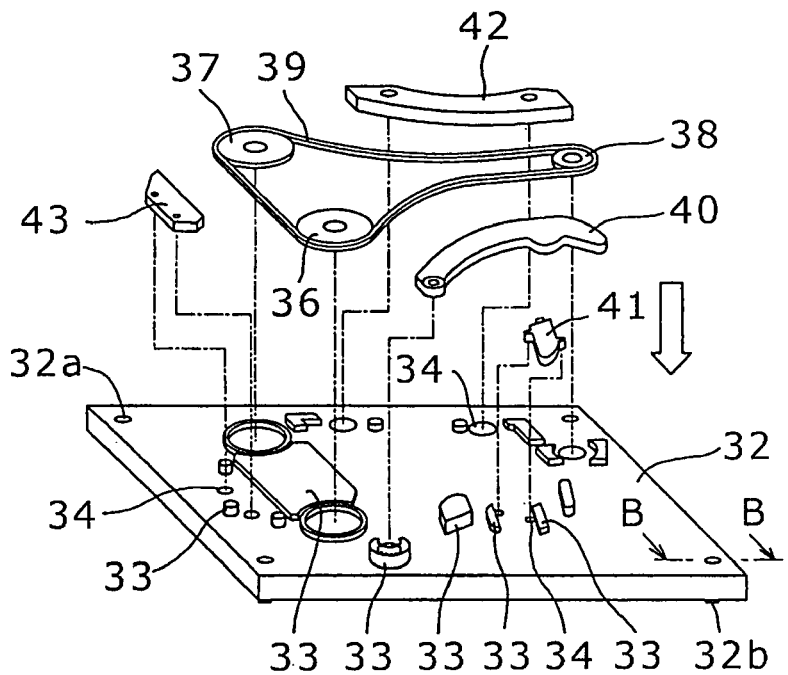
FIG. 1 is an explodes perspective view showing a set of timing drive parts on a panel in accordance with the invention.
Figure 2:
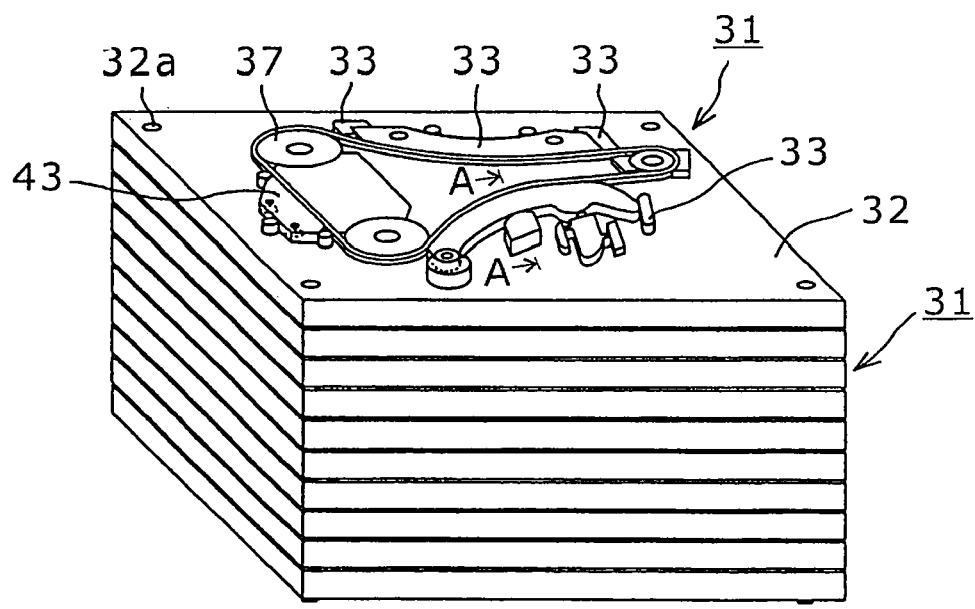
FIG. 2 is a perspective view of a stack of parts-retaining panels having sets of-parts retained thereon.
Figure 3:
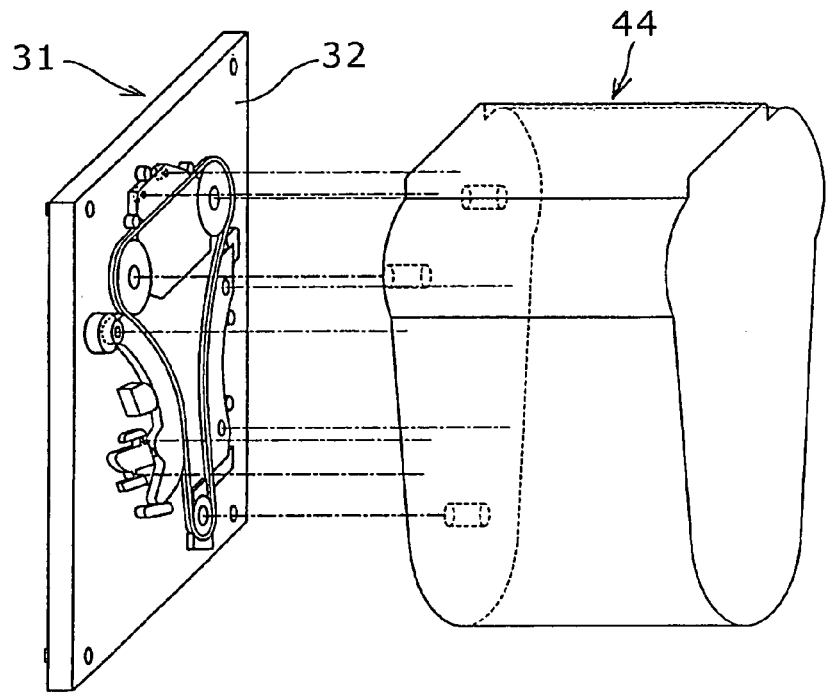
FIG. 3 is an exploded perspective view showing a parts-retaining panel carrying parts of a chain drive, in a condition just before the parts are mounted on an engine.
Figure 4:
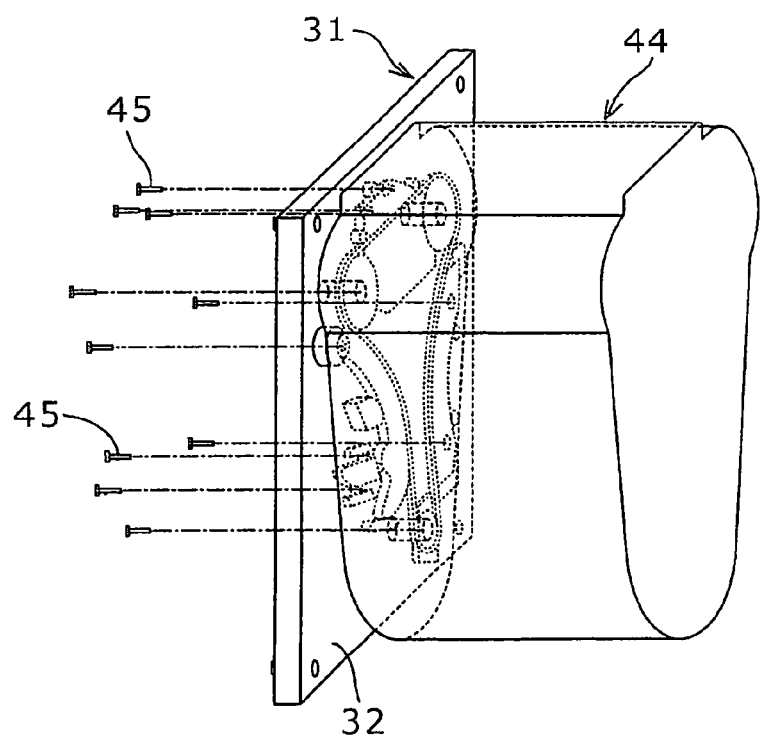
FIG. 4 is an exploded perspective view illustrating the mounting and securing of the chain drive parts on the engine.
Figure 5:
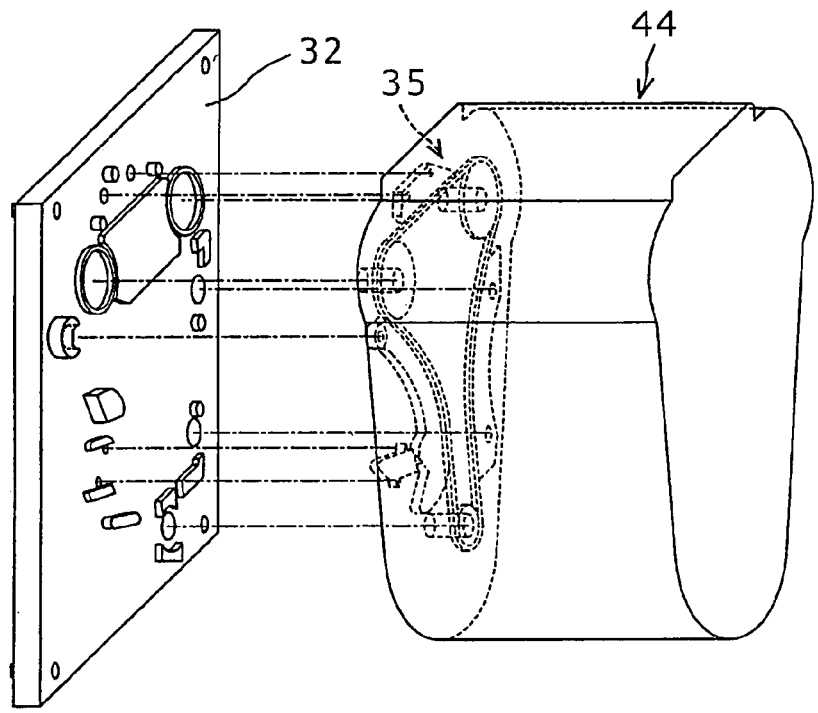
FIG. 5 is a perspective view illustrating the removal of the parts-retaining panel while the chain drive parts are mounted on the engine.
Figure 6:
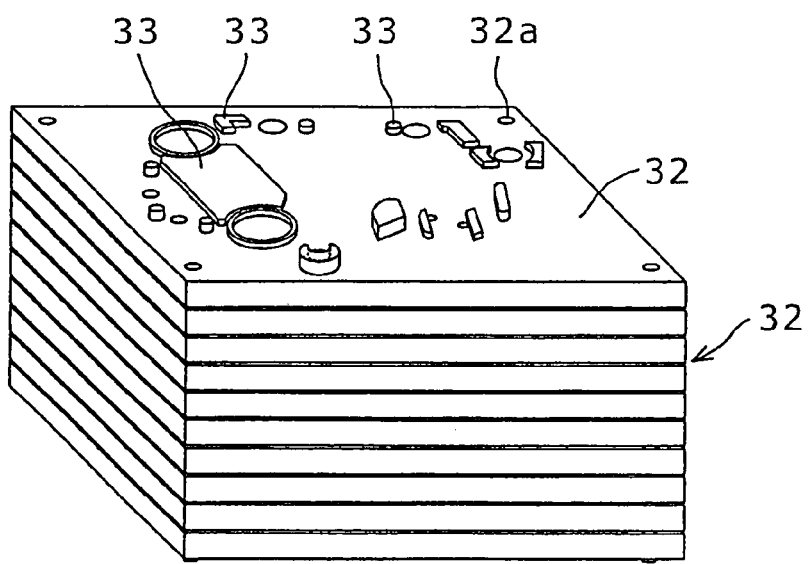
FIG. 6 is a perspective view of a stack of part-retaining panels without the retained parts.

FIGS. 1 to 6 illustrate the use of a parts-retaining panel 31 and the mounting order of the panel on an automobile engine 44. As shown in FIG. 1, parts 36 to 43 of a chain-type timing drive are mounted on a parts-retaining panel 32. In FIG. 2, multiple parts-retaining panels are arranged in a stack 31, each with the parts retained thereon. As will appear, the underside of each of the panels is hollow to provide a space to accommodate the parts retained on a next adjacent panel. FIG. 3 shows a panel carrying timing drive parts 36 to 43 in face-to-face relationship with a mounting surface of an engine 44 before transfer of the parts from the panel to the engine. In FIG. 4, the parts are shown being secured to the engine by fasteners 45, and in FIG. 5, the panel 32 is shown being removed from the engine after the timing drive parts 36 to 43 have been secured to the engine 44. After removal of the panels from the engine after transfer of parts, the panels can be restacked as shown in FIG. 6.

The two main kinds of timing drives systems for automobile engines are the chain drive and the toothed belt drive. The former uses a chain (for example a silent chain) and a set of sprockets, while the latter uses a toothed belt and a set of toothed pulleys. In general, the other components, e.g. guides, tensioners, etc., are common to both systems. The invention will be described with reference to a chain-type timing drive, but it should be understood that the principles of the invention are applicable to both types of drives.

As shown in FIGS. 2–4, the parts 36–43 for a chain drive 35, are removably retained on panel 32 in the same relative positions as when mounted on the engine 44. After the parts 36–43 for the chain drive system 35 are mounted and secured onto the engine 44, only the panel 32 is removed.

Figure 9:
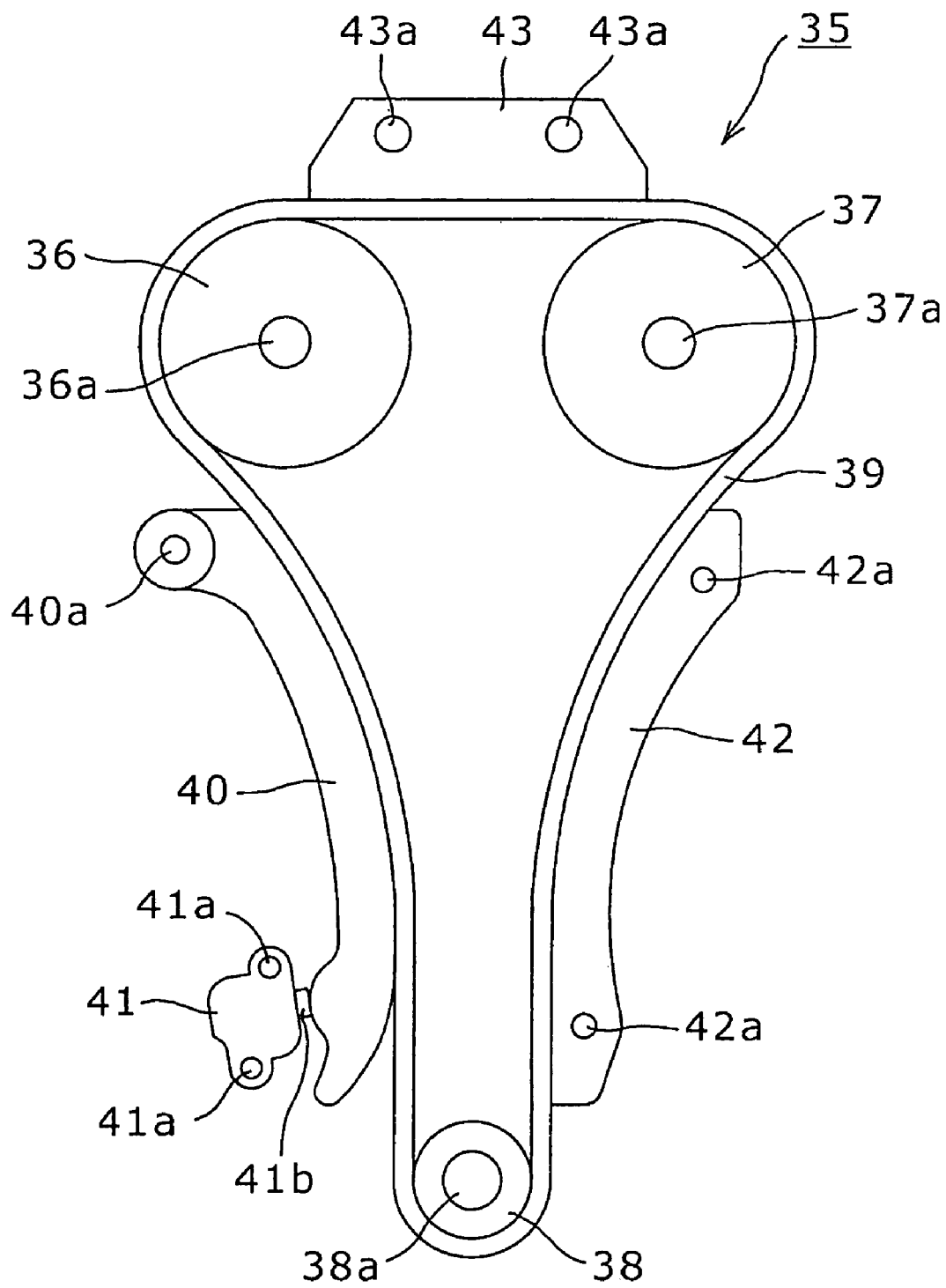
FIG. 9 is an elevational view showing an arrangement of parts of a chain drive mounted on an engine.

The panel is preferably a metal panel, and retainers 33 are provided on the panel for securing and retaining the parts 36–43 for the chain drive 35 at appropriate positions. Through holes 34 (FIG. 1), through which the fasteners 45 (FIG. 4) are inserted when the parts 36–43 are secured to the engine 44, are provided in positions such that they become aligned with shaft holes 36a, 37a, 38a and 40a and mounting holes 41a, 42a and 43a, as shown in FIG. 9, when the panel is brought into face-to-face relationship with the mounting surface of the engine.

The retainers 33 protrude from the panel. Their sizes and positions can be such that they retain only the proper parts for the particular engine being assembled. An improper part, or a missing part, will be readily detected, and consequently improper mounting of the parts may be prevented.

Figure 7:
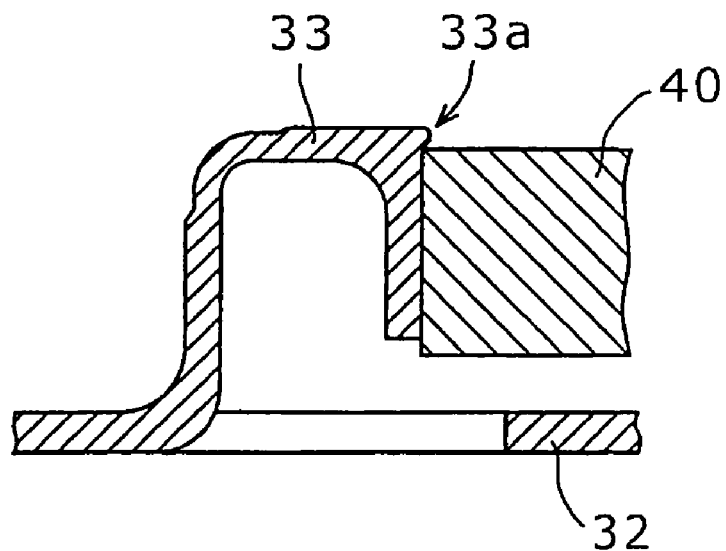
FIG. 7 is a cross-sectional view taken on plane A—A in FIG. 2.

As shown in FIG. 7, a tensioner lever 40, is held on the panel 32 by a retainer 33. An intermittent or continuous, flange-shaped, locking protrusion 33a is formed at a tip of the retainer 33. The tensioner lever 40 is removably secured and retained on the panel 32 by the locking protrusion 33a. Other parts are removably retained on the panel 32 by similar locking protrusions.

Figure 8:
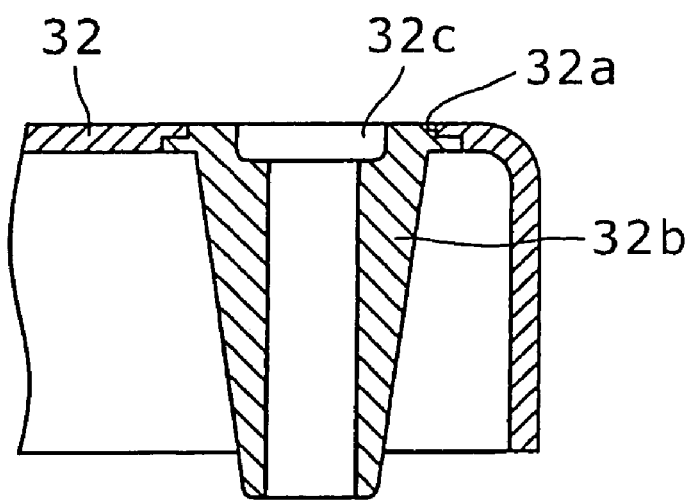
FIG. 8 is a cross-sectional view taken on plane B—B in FIG. 1.

As shown in FIG. 8, each corner of the panel 32 is provided with a hole 32a. A leg 32b, which is fitted into the hole 32a, extends from the back side of the panel, i.e., the side opposite the side from which the retainers protrude and on which the parts are mounted. Each leg has a recess 32c, which conforms to, and receives a leg protruding from a next panel. Thus, the panels 32 may be stably stacked as shown in FIG. 2. The lengths of the legs 32b are such that, when panels on which parts 36 to 43 are retained are stacked, they are spaced from one another by a sufficient distance to accommodate the parts.

FIG. 9 shows an arrangement state when the chain drive system 35 was incorporated into the engine body 44, and in this arrangement state the parts 36 to 43 in the chain drive system 35 are removably secured and retained on the panel 32.

The parts 36 to 43 are preferably retained on the panel 32 in an assembled condition. That is, they are on the panel in the same cooperative relationship to one another as they would be in when mounted on the engine. When the parts 36 to 43 are retained in this manner, mounting and securing of the parts onto the engine 44 can be carried out easily.

Referring to FIG. 9, camshaft sprockets 36 and 37 are mounted and secured onto the respective camshafts (not shown) of a DOHC engine 44 through shaft holes 36a and 37a, respectively. A crankshaft sprocket 38 is mounted and secured onto a crankshaft provided in the engine 44 through a shaft hole 38a. The securing to the respective shafts is carried out with a fastener 45 (FIG. 4), such as a key, a bolt with washer or the like. Transmission chain 39 is wrapped around the camshaft sprockets 36 and 37 and the crankshaft sprocket 38.

A tensioner lever 40, which imparts tension to the chain 39, is pivoted to the engine body 44 through a shaft hole 40a. A tensioner 41, which presses this tensioner lever 40, is secured to the engine 44 by fasteners 45, such as bolts, screws or the like through mounting holes 41a.

The plunger 41b of a tensioner 41 presses a tensioner lever 40 against a transmission chain 39. A locking mechanism (not shown) of the kind typically used to prevent protruding movement of the plunger before mounting on the engine, can be released as soon as the parts are mounted on the panel, and before the assembly is mounted on the engine. The engagement of the plunger with the lever, and the engagement of the lever with the chain will hold the plunger in its proper position during the mounting of parts.

Guides 42 and 43, which guide the chain 39 so that it does not vibrate, are also secured to the engine body 44 by fasteners 45, such as bolt, screws or the like, through mounting holes 42a and 43a, respectively.

As shown in FIG. 2, the panels 31, on which the parts of the chain drive 35 are removably retained, can be stored, transported and conveyed while stacked.

The parts retaining panel 31 is brought into face-to-face relationship with a timing drive mounting surface of an engine 44 as shown in FIG. 3. The parts for the drive 35 are secured at the appropriate positions on the engine 44 by fasteners 45 as shown in FIG. 4.

After the parts 36–43 of the timing drive 35 are secured to the engine 44, the panel 32 is moved away from the engine. Only the panel 32 is removed, as shown in FIG. 5. The panels 32 from which the parts have been removed, may be stacked as shown in FIG. 6 for storage or transport.

The timing drive parts are either partially assembled or completely assembled as a unit on the parts-retaining panel in the same relative positions that they will be in when mounted on an engine. Accordingly, the parts can be moved to the mounting surface of the engine 44 in one operation, and the mounting and securing of the parts onto the engine 44 can be easily carried out, with a significant saving of time.

After the parts 36–43 are mounted on and secured to the engine, the panel 32 can be removed by itself. The mounting of an improper part or the inadvertent omission of a particular part can be avoided reliably. Furthermore, as the panel is removed, any part remaining on the panel 32 will be recognized immediately.

Since the panel 32 is provided with legs 32b, the chain parts retaining panels can be stacked with or without parts retained thereon, for easy storage and transport. Furthermore, after the parts are transferred from the parts-retaining panels, the panels can be re-used.

The parts-retaining panels as described are composed of metal. However, as an alternative, the panels may be composed of synthetic resin. The parts retainers on the metal panels may be formed by pressing, or, in the case of a synthetic resin panel, they may be formed by molding. Alternatively, the retainers may be formed separately and mounted on a surface of a metal or synthetic resin panel by an adhesive or by bolts, screws, or other fasteners. If bolts, screws or similar fasteners are used, the parts-retaining panels can be modified by changing the mounting positions of the retainers.

A toothed belt drive assembly panel, will have substantially the same configuration and effects as those of the chain drive assembly panel.

In the case of a bicycle, a parts-retaining panel carries a chain, a pedal sprocket a rear wheel sprocket, all of which are removably retained on the panel in the same relative positions and cooperative relationship as when mounted on the bicycle. A toothed belt and toothed wheels for a bicycle drive or the like can be mounted similarly on a parts-retaining panel.

As in the case of a timing drive, in assembling a bicycle, the parts-retaining panel, carrying the chain and sprockets, is brought into face-to-face relationship with the bicycle frame, the parts retained on the panel are mounted on, and secured to, the bicycle, and only the panel is removed. Many of the same advantages are realized in the case of a bicycle, as in the case of an engine timing drive.

As mentioned previously, the invention allows the mounting and securing of the parts of a mechanism to be carried out more rapidly and more easily, and reduces the chance of mounting a wrong part or inadvertently omitting a part. The invention also has the advantage that the parts-retaining panel can be removed and re-used. The provision of protruding retainers and through holes on the parts-retaining panel further facilitates the mounting and securing of timing drive parts on the panel. The mounting and securing of the parts on an engine is further facilitated by retaining the parts on the panel in the same cooperative relationship to one another as when in operative relationship in the engine. The provision of legs at the corners of the panels improves storage, transportation, and handling of the parts-retaining panels, both with and without timing drive parts retained thereon. Using recyclable panels contributed to saving of resources.

Furthermore, whereas the pre-assembled timing drive, provided in a case for mounting on an engine, as described in British patent application 2347174, required measures to achieve high thermal resistance and vibration-damping for the case and accommodation of the case to the shape and the size of the engine, the invention eliminates these problems. The invention reduces costs, and avoids the thermal and vibration problems. Furthermore, since the panel only retains the timing drive parts temporarily, the size of the panel is not affected by the size and shape of the engine.

We claim:

1. An assembly comprising a parts-retaining panel, having a front side and a rear side facing in opposite directions, and a set of cooperating parts for a mechanism, said parts being removably retained on the front side of said parts-retaining panel in the same positions relative to one another as the positions of said parts relative to one another when in operative relationship in said mechanism, said panel being removable from said parts by movement of the panel, in the direction in which the rear side faces, when the parts are mounted in operative relationship in said mechanism, in which said panel has a plurality of legs extending from said rear side in the direction in which said rear side faces, said legs being substantially entirely rearward of said retained parts, being engageable with an adjacent, identical, panel, and being of sufficient length to maintain said panels in spaced relationship to each other when stacked, and to establish a hollow space between said panels sufficient to accommodate an identical set of parts retained on said adjacent panel.

2. An assembly according to claim 1, in which said set of cooperating parts consists of parts for a timing drive of an internal combustion engine, said parts being removably retained on said parts-retaining panel in the same positions relative to one another as the positions of said parts relative to one another when in operative relationship in said engine, said panel being removable from said parts when the parts are mounted in operative relationship in said engine.

3. An assembly according to claim 2, in which said parts-retaining panel includes a plurality of retainers protruding from said front side thereof, said retainers holding said parts on the panel, and in which said panel also includes a plurality of through holes through which fasteners for securing said parts to the engine can be inserted.

4. An assembly according to claim 2, in which said parts are retained on said panel in the same cooperative relationship to one another as when in operative relationship in said engine.

5. An assembly according to claim 3, in which said parts are retained on said panel in the same cooperative relationship to one another as when in operative relationship in said engine.

6. An assembly according to claim 1, in which said panel has a plurality of corners, and in which each of said legs is positioned at one of said corners.

7. An assembly according to claim 2, in which said panel has a plurality of corners, and in which each of said legs is positioned at one of said corners.

8. An assembly according to claim 3, in which said panel has a plurality of corners, and in which each of said legs is positioned at one of said corners.

9. An assembly according to claim 4, in which said panel has a plurality of corners, and in which each of said legs is positioned atone of said corners.

10. An assembly according to claim 2, in which said panel is recyclable.

11. An assembly according to claim 3, in which said panel is recyclable.

12. An assembly according to claim 4, in which said panel is recyclable.

13. An assembly according to claim 5, in which said panel is recyclable.

14. An assembly according to claim 6, in which said panel is recyclable.

15. An assembly according to claim 7, in which said panel is recyclable.

16. An assembly according to claim 8, in which said panel is recyclable.

17. An assembly according to claim 9, in which said panel is recyclable.

* * * * *